March 31, 1964 T. V. FEICHTMEIR ETAL 3,127,062
SEMI-AUTOMATIC SAMPLING AND DILUTING APPARATUS
Filed Nov. 21, 1960 2 Sheets-Sheet 1

INVENTORS
THOMAS V. FEICHTMEIR &
KENNETH D. JENKINS
BY
Gardner & Zimmerman
ATTORNEYS March 31, 1964 T. V. FEICHTMEIR ETAL 3,127,062
SEMI-AUTOMATIC SAMPLING AND DILUTING APPARATUS
Filed Nov. 21, 1960 2 Sheets-Sheet 2

INVENTORS
THOMAS V. FEICHTMEIR &
KENNETH D. JENKINS
BY
Gardner + Zimmerman
ATTORNEYS

United States Patent Office 3,127,062
Patented Mar. 31, 1964

3,127,062
SEMI-AUTOMATIC SAMPLING AND DILUTING
APPARATUS
Thomas V. Feichtmeir, San Francisco, and Kenneth D. Jenkins, Berkeley, Calif., assignors, by direct and mesne assignments, to Research Specialties Co., a corporation of California
Filed Nov. 21, 1960, Ser. No. 70,713
6 Claims. (Cl. 222—135)

The present invention relates, in general, to apparatus for the measurement and dilution of fluid samples and, more particularly, to semi-automatic apparatus for expediting the taking and admixing of predetermined volumes of two fluids, e.g., sample and diluent or reagent.

Procedures involving the admixture of predetermined volumes of fluids are of a ubiquitous nature. The necessity of repetitiously or routinely preparing admixtures of precise volumes of certain fluids with diluents or reagents is especially common in chemical and biological analytic procedures as well as in a variety of manufacturing procedures. For example, in hematology clinical procedures precise volume dilution of whole blood may be required for hemoglobin, white blood cell and red blood cell counts. In clinical chemistry procedures similar preparations are required, e.g., for the determination of chloride, sodium, potassium, glucose, albumin, globulin and blood urea nitrogen, inter alia. Similar sample preparations are, of course, required in a large variety of organic, inorganic and biochemical analyses as well as in chemical manufacturing processes as in preparing catalyst and accelerator aliquots, dosages and the like.

Heretofore, precise operations of the character described have usually been performed manually employing pipettes, burettes, volumetric flasks and the like. It will be appreciated that such operations are tedious, time-consuming and may be subject to error unless rigid precautions are observed. The latter possibility is aggravated where different operators are employed each with his own peculiar routine and associated systematic error. Accordingly, it is apparent that a considerable need exists for compact precision equipment whereby such operations may be automated with concomitant elimination of wasteful manual effort and opportunity for human error.

In accordance with the present invention a compact, self-contained, unitary apparatus is provided for effecting the operations indicated above with a minimum amount of manual manipulation. Such apparatus incorporates powered fluid chambers especially adapted for precision adjustment and for the intake and discharge of precise and reproducible amounts of fluids in admixture. The sequence of operations is programmed and governed by a control element which is simply and positively operated so as to permit the establishment of rigorous routine which minimizes the possibility of error.

Accordingly, it is an object of the present invention to provide apparatus for the preparation of precise volumetric admixtures of fluids.

Another object of the invention is to provide a compact, semi-automatic, self-contained unitary apparatus for preparing dilution admixtures of precise amounts of selected fluid components.

Still another object of the invention is to provide sampling and diluting apparatus as above described incorporating volumetric chambers adapted for precise adjustment and calibration so as to deliver exact amounts and/or dilutions of selected fluids.

A further object of the invention is to provide unitary apparatus for the precision sampling and dilution of analytical samples adapted for semi-automatic operation upon manipulation of a single three-position control valve element.

A still further object of the invention is to provide sampling and diluting apparatus arranged in modular form incorporating powered volumetric elements especially adapted for precision adjustment and to deliver precise quantities of fluid reproducibly.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims. With reference to said drawing:

The sampler-dilutor apparatus of the invention in its present embodiment basically comprises a first powered precision displacement volumetric chamber adapted for precise calibrated adjustment for measuring and delivering from said chamber a first selected fluid, e.g., reagent, diluent or solvent, together with a second similar volumetric or pipette chamber for measuring and delivering a second fluid in admixture with the first. The volumetric chambers involve a novel construction utilizing a precision ground plunger of a precision uniform predetermined cross-section which enters the volumetric chamber through a compliant stationary seal. The volume of fluid which is drawn therein by outward displacement, i.e., retraction, of said plunger is determined by stops one of which is preset by a micrometer adjustment which, due to the aforesaid construction, may be calibrated by means of a simple precise linear scale. The fluid circuits employed with the aforesaid chambers is, moreover, advantageously adapted to fully utilize the precision characteristics of such chambers with the optimum degree of efficiency all as described more fully hereinafter. Motor means is provided to power said chambers, and a single three position control valve is utilized to program the operations of such chambers and establish proper fluid conduit circuits correlatively therewith. Provision is also made for coupling to an external fluid supply to provide said first fluid and a simple non-calibrated tip is employed for obtaining and dispensing the measured volume of said second fluid in admixture with the first.

Figure 1:
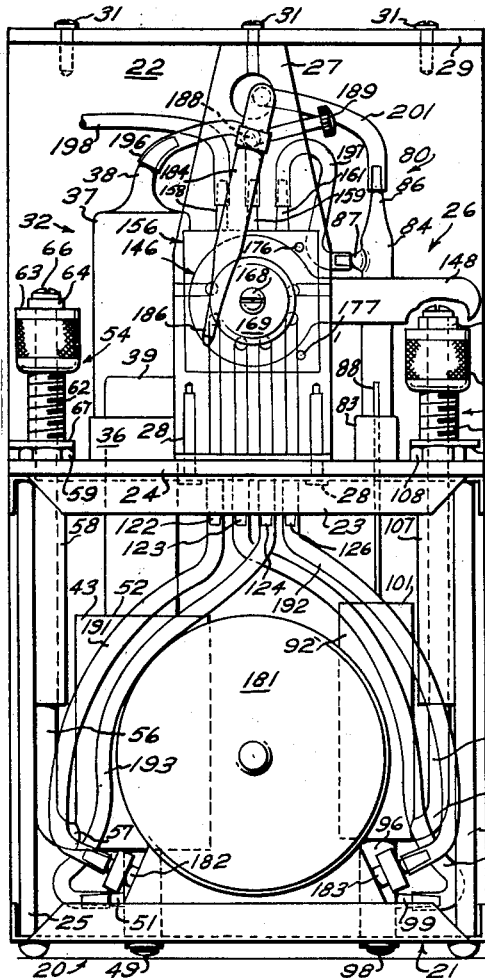
FIGURE 1 is a front view of a unitary sampling and diluting apparatus constructed in accordance with the present invention.
Figure 2:
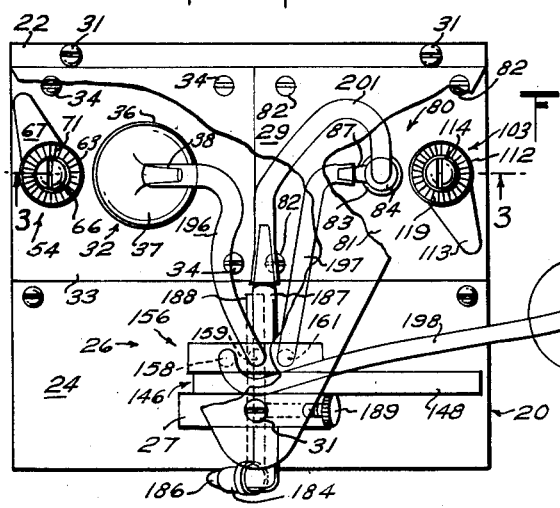
FIGURE 2 is a plan view of the apparatus shown in FIGURE 1.

More specifically, and with reference to the drawings, a unitary sampler-diluter indicated generally at 20, may be assembled as best shown in FIGURES 1 and 2. A supporting structure comprising a base plate 21, an upright back panel 22 rigidly attached thereto and a horizontal metal deck 23 extending forwardly from midportions of the panel 22 provide an appropriately tiered arrangement for support of the operational portions of the apparatus presently to be described. An overlay 24, e.g., of Bakelite may be applied over metal deck 23 for ease in cleaning and sanitary reasons. Supporting columns 25 extending between forward corners of the plate 21 and deck 23 serve to increase the rigidity of the support structure. For convenience and simplicity the control valve assembly 26, to be later described in detail, is carried on the support structure by constructing a portion thereof in the form of a forward side plate 27 attached by machine screws 28 or the like to a central forward portion of deck 23. A cover plate 29 made, e.g., of clear plastic extends between and overlies the upper edges of back panel 22 and plate 27 and is secured thereto by screws 31.

Figure 3:
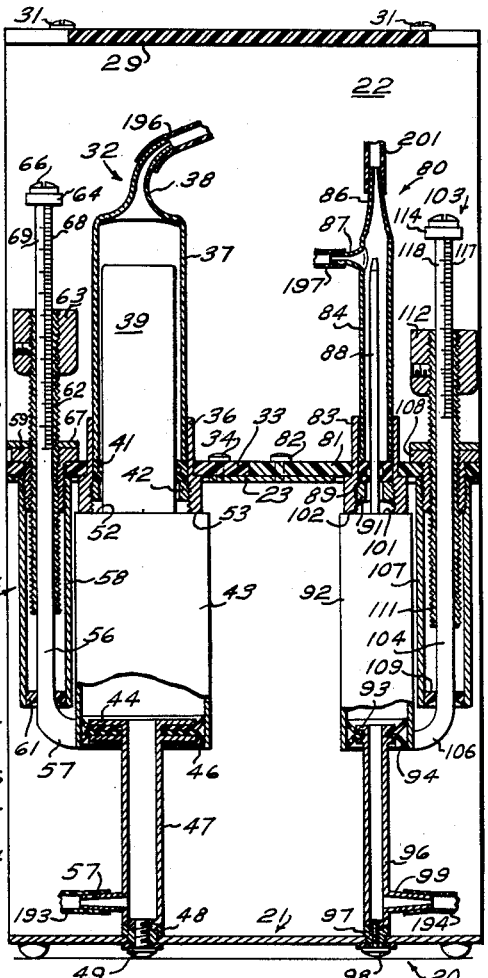
FIGURE 3 is a vertical sectional view along the plane 3—3 of FIGURE 2 illustrating specific details of the structure of the volumetric elements of the apparatus.

The volumetric chamber means employed to measure and deliver the first fluid will generally be of a larger relative size appropriate to furnish the larger volume of, e.g., diluent to be employed and is provided as an assembly 32. Assembly 32 is advantageously constructed in a modular form upon a base segment 33 of deck overlay 24 and attached to the deck as by means of machine screws 34 as shown in FIGURE 3. The segment 33 as well as other portions of overlay 24 may be formed of opaque rigid plastic. As seen in FIGURE 3, a heavy gauge metal ferrule 36 is cemented rigidly in place so as to transpierce segment 33 and a glass bell chamber 37 is cemented within the upper portions thereof to project upwardly above the deck to terminate in an orifice tip 38. A fluid displacement plunger 39 enters the lower portion of bell chamber in a fluid tight low friction relation provided by the inner periphery of a grooved Teflon washer 41 retained and compressed by means of a locking ring 42 secured into the lower portion of ferrule 36 subjacent the lower open end of the bell chamber.

In order to obtain the desired degree of precision so as to obtain the delivery of a consistently accurate volume per unit length of plunger displacement, as mentioned above, the plunger 39 is made of a non-corrosive material such as stainless steel, precision ground to a uniform diameter. The plunger fits loosely within chamber 37 with no points of contact therebetween and wherefore only one precision finish surface is required and no wear can take place. This feature advantageously contributes to long service life, low maintenance and retention of precision.

Motive power is applied to plunger 39 by a double-acting piston chamber 43 attached to the lower end thereof, such chamber including a double action piston head 44 therein provided with peripheral compliant edge seals 46. A hollow push rod 47 extends downwardly from the piston and is loosely attached to base plate 21 as by means of a collar 48 and screw 49 which also seals the lower end thereof. A sidearm 51 is provided in the lower portion of pushrod 47 to permit application of air pressure or vacuum to the interior of piston chamber 43 above the piston head 44 and thereby selectively raise and lower the plunger. Moreover, the upper side 52 of chamber 43 may be arranged to contact the lower edge 53 of ferrule 36 to serve as a stop precisely limiting upward travel of the housing of chamber 43 and plunger 39.

Downward travel of plunger 39 and its associated chamber 43 may be adjustably and precisely limited to assure delivery of precise amounts of the diluent by means of an adjustable stop 54 which includes a stoprod 56 mounted rigidly to chamber 43 as by means of bracket 57 and extending upwardly through deck segment 33 parallel to piston 39. More specifically, the pushrod 56 is arranged within a downwardly projecting sleeve 58 attached as by means of a threaded bushing 59 to segment 33. In the lower portion of sleeve 58 a low friction bearing 61, e.g., of Teflon assists in obtaining rigid alignment. A micrometrically threaded sleeve 62 provided with an upper knurled head 63 is arranged within bushing 59 so that upon downward travel of plunger 39, a cap 64 affixed with a screw 66 to the upper end of pushrod 56 will engage the head 63 and thereby limit downward stoprod travel. Sleeve 62 is locked in proper adjustment by means of lever 67 threaded to engage the micrometric threads thereof upon rotation to effect contact with the upper end surface of bushing 59. A highly accurate calibration is provided by means of graduated scale 68 on a flat side surface of pushrod 56 with a corresponding numerical scale 69 on an adjacent flat side surface. A vernier scale 71 may be provided by appropriately inscribing the upper surface of knurled head 63 as shown in FIGURE 2. Appropriate volumes may be indicated as in milliliters.

The second volumetric chamber means employed to draw a measured quantity of the sample to be diluted, is generally of relatively smaller capacity but is otherwise generally similar to assembly 32 and is herein indicated as assembly 80. Assembly 80 is constructed upon an overlay segment 81 affixed by means of screws 82 to deck 23 and transpierced by a ferrule 83 cemented therein. A glass bell chamber 84, cemented in the upper portion thereof terminates upwardly in a tip orifice 86 with a sidearm 87 being provided in the upper portion thereof. A fluid displacement plunger 88 of a relatively small, precision-ground, uniform diameter as above enters the lower end of chamber 84 through an inner periphery, grooved Teflon washer 89 held in place and compressed by a locking ring 91 screwed into ferrule 83.

Motive power is applied to plunger 88 by a double-acting piston chamber 92 attached at the lower end thereof and provided with a double-acting piston head 93 fitted with compliant edging 94 having a hollow pushrod 96 extending downwardly to be loosely attached to base plate 21 by means of a collar 97 and screw 98. A sidearm 99 is also provided as above described in connection with a first chamber means. Likewise, the upper side 101 of chamber 92 contacts the lower edge 102 of ferrule 83 as a percision limit stop as to upward travel of the housing of chamber 92 and the plunger 88 carried thereby.

Downward travel of plunger 88 is limited by means of an adjustable stop 103 including a stoprod 104 attached rigidly to chamber 92 with a bracket 106. As above described, a sleeve 107 attached by a threaded bushing 108 and fitted with a Teflon bearing 109 is utilized for alignment. A micrometrically threaded sleeve 111 having a knurled head 112 is threaded into bushing 108 and is provided with a locking lever 113. A cap 114 affixed to the upper end of rod 104, upon downward travel of the latter contacts head 112 as a precision adjustable stop. Adjacent flatside surfaces of stop rod 104 may be provided with a graduated scale 117 and numerical calibrations 118, e.g., as in λ (lambda) units as employed in clinical analyses. Likewise, a vernier scale 119 may be provided on the upper surface of knurled head 112.

Figure 5:
FIGURE 5 is a front view of the forward side plate of the control valve assembly of FIGURE 4, portions thereof being broken away.

The control valve means of the instant apparatus may be constructed as disclosed above as an assembly which is self-supporting by virtue of the shape and manner of attachment of forward side plate 27 between deck 23 and cover plate 29. More specifically, as best shown in FIGURE 5 a rubber base 121 is provided with a plurality of connector tips 122, 123, 124 and 126 depending downwardly therefrom. These tips are adapted for connection to a pump, presently to be described and to the respective actuating mechanisms for actuating the plungers, as will be also described in more detail. Base 121 is disposed on deck 23 with plate 27 positioned thereon in sealed relation as retained by screws 28. Plate 27 may be fabricated of a clear transparent plastic such as Lucite which has adequate chemical resistance and other requisite properties, and as will be noted is provided with upwardly extending conduit bores 128, 129, 131 and 132 communicating with tips 122, 123, 124 and 126, respectively. The upper ends of the bores terminate in rearwardly directed orifices 133, 134, 136 and 137, respectively, arranged along an arcuate annular area centered about a horizontal perforation 127 provided in plate 27 and substantially below a horizontal line therethrough. An additional orifice 138 and 139 is provided at about such horizontal line on each side of perforation 127 in an extension of said annular area, said orifices being extended laterally to either side as conduits 141 and 142, respectively, to communicate with the open atmoshphere.

Figure 6:
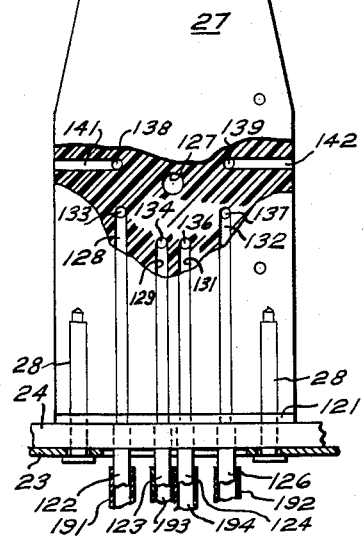
FIGURE 6 is a front view of the rotary core or plug component of the control valve assembly of FIGURE 4, with a portion thereof being broken away to more clearly illustrate structural details.
Figure 6:
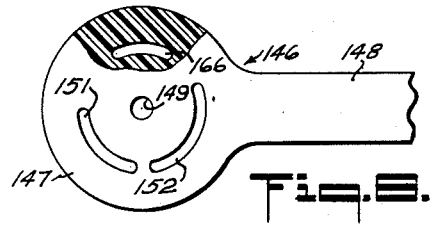
Figure 7:
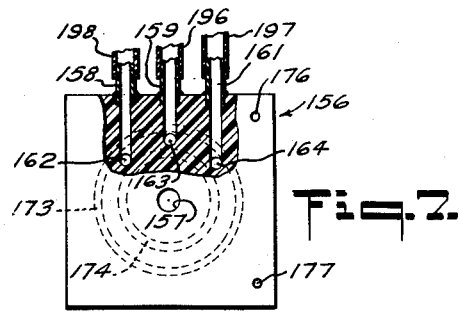
FIGURE 7 is a front view of the rearward side plate of the control valve assembly of FIGURE 4, a portion thereof being broken away.

Necessary conduit coupling and switching functions of the control valve 26 are provided by a rotary core component 146 best illustrated in FIGURE 6 of the drawings. More specifically, valve core 146 is preferably constructed of flat Teflon stock to utilize the low friction and chemically insert characteristics thereof. Core 146 is in the form of a substantially circular rotor portion 147 with an outwardly extending handle lever 148. A central perforation 149 is provided in portion 147 corresponding to and aligned with perforation 127 of plate 27. The forward face of portion 147 is provided with a segmental arcuate groove 151, generally to the left of perforation 149 in a position corresponding to the aforesaid annular area of plate 27 as well as a second segmental arcuate groove 152 disposed in a similar location generally to the lower right of said perforation 149. Such grooves 151 and 152 interconnect appropriate groups of the aforesaid orifices 133, 134, 136 and 137 in plate 27 as described more fully hereinafter.

The control valve assembly 26 also includes a rear side plate member 156 disposed in parallel spaced relation to plate 27, and provided with a central perforation 157 corresponding to and aligned with the perforations 127 and 149. Connector conduit tips 158, 159 and 161 are provided along the upper edge of plate 156 communicating through vertical passages with orifices 162, 163, 164, respectively provided along an annular, arcuate area on the forward face of plate member 156 and opposed to the rear face of core portion 147. In order to couple the central orifice 163 alternately with orifices 162 and 164 for purposes noted below an arcuate groove segment 166 is provided in such rear face.

Figure 4:
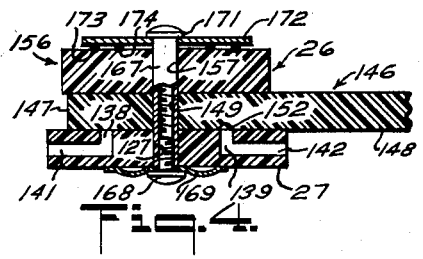
FIGURE 4 is a horizontal sectional view of the control valve assembly of FIGURE 1.

Control valve 26 is assembled as best shown in FIGURE 4 of the drawings so that the core portion 147 is positioned between the plates 27 and 156 for rotary movement therebetween. An axle member 167 is passed through perforations 127, 149 and 157 to be engaged by a machine screw 168 bearing on the forward surface of plate 27 through a washer 169. The flange head 171 of axle 167 bears upon a washer 172 supported by O-rings 173, 174 concentrically disposed in the rearward face of member 156. Orifice 163 is extended rearwardly through plate member 156 to communicate with the annular area between said O-rings and exert a positive pressure tending to seat the valve components more firmly. A material such as lubriseal or silicone grease may be used to lubricate and seal the surfaces. Pins 176 and 177 respectively are disposed in perforations in the upper and lower right hand corners of member 156 and corresponding locations in plate 27 to maintain positive alignment and also to serve as stops limiting the rotation of valve lever 148 and the valve core portion 147 actuated thereby.

Motive power for actuating the plungers 39 and 88 is provided by means of a compact combination vacuum-pressure pump 181 of generally conventional design mounted on base 21 having a check valve suction inlet 182 and an air pressure check valve outlet 183. Appropriate electrical cord connections and a switch (not shown) are employed for coupling to an electrical power outlet.

A pipette-like tip 184 formed of glass tubing, having a pointed end 186, and bent at a right angle with a portion 187 projecting rearwardly through a perforation in plate 27 is employed for the intake of sample and discharge of the admixed fluids. A support rod 188 disposed in a second perforation in plate 27 and engaged by a lock screw 189 may be employed to position said tip at a most convenient spacing with respect to plate 27.

Tygon tubing or any equivalent inert flexible tubing may be employed for coupling the various components as shown in FIGURES 1 to 3. For example, tubing 191 couples the suction intake 182 of the pump to connector tip 122, and thus to conduit 128 and orifice 133 of valve 26. Tubing 192 couples the pump outlet 183 to connector tip 126, and consequently to conduit 132 and orifice 137 of valve 26. Another tubing section 193 couples sidearm 51 of the diluent double-acting piston to the orifice 136 of valve 26 through conduit 131 and the connector tip 124. A tubing section 194 couples the sidearm 99 of the sampling double-acting piston to tip 123 and thus through conduit 129 to the orifice 134 of valve 26. Such tubing sections are all located beneath the deck 23 which region is normally enclosed by a housing (not shown).

Above the deck 23, a tubing section 196 couples the orifice tip 38 of diluent chamber 37 to tip 159 and thus to the orifice 163 in plate 156 of valve 26. A second section 197 couples sidearm 87 of sample chamber 84 to the tip 161 and orifice 164 of plate 156. An additional tubing section 198 couples the connector tip 158 and orifice 162 of plate 156 to an external diluent container 199 as shown in FIGURE 2. A fourth tubing section 201 couples the orifice tip 86 of sample chamber 84 to portion 187 of tip 184.

Figure 8:
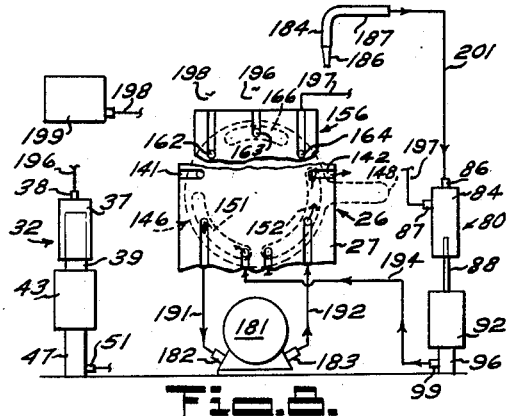
FIGURE 8 is a schematic diagram indicating the circuits in the apparatus with the valve handle positioned in a first horizontal sample charging position.

Accordingly, in operation, and as may be seen by reference to FIGURE 8 when the valve lever handle 148 is moved to the horizontal position intermediate the stop elements 176 and 177, vacuum is applied through the pump suction inlet 182 to the chamber 92 via tubing 191, connector tip 122, conduit 128, passage 151 in the rotor, conduit 129, tip 123, tubing 194, sidearm 99, pushrod 96 and thus into chamber 92. Such vacuum results in a retraction of the chamber housing 92 and the plunger 88 carried thereby, and a precise amount of the sample to be subsequently diluted is drawn into chamber 84 through the tip 184 via portion 187 and tubing 201 into the chamber. During this vacuum cycle, air from pump 181 is exhausted through the vent conduit 142 which is connected to the pump outlet 183 through tubing 192, tip 126, passage 132, rotor groove 152 and thus to the vent 142.

Figure 9:
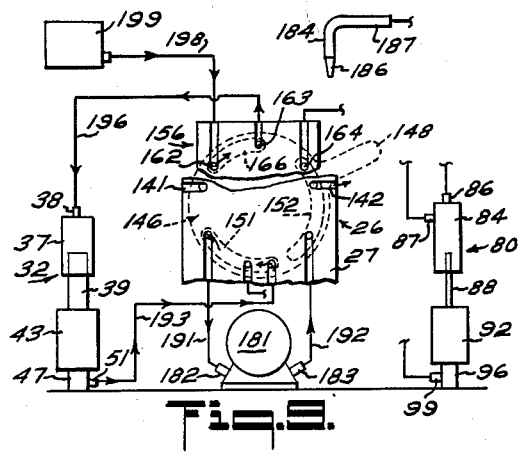
FIGURE 9 is a schematic diagram similar to FIGURE 8, but indicating the circuits in the apparatus with the valve handle positioned in the second upraised diluent charging position.
Figure 10:
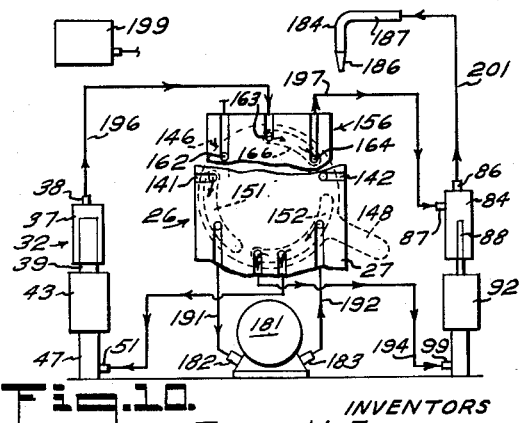
FIGURE 10 is a schematic diagram similar to FIGURES 8 and 9 but indicating the circuits of the apparatus with the valve handle depressed in the third fluid admixture discharging position.

To introduce the desired and precise quantity of diluent into chamber 37, the rotor handle is moved upwardly against stop 176 as best shown in FIGURE 9 of the drawings. Such movement places the diluent reservoir 199 in communication with chamber 37 through tubing 198, tip 158, orifice 162, rotor passage 166, orifice 163, tip 159, and tubing 196 which is connected to the upper end of chamber 37. At the same time, the plunger 39 and chamber housing 43 are retracted so as to cause the flow of diluent into chamber 37. Such retraction is effected by a vacuum imparted to chamber 43 from the pump suction inlet 182 via tubing 191, tip 122, conduit 128, rotor passage 151, conduit 131, tip 124, tubing 193, sidearm 51 and hollow pushrod 47. Air will continue to be exhausted through vent orifice 142 in the manner above explained.

Next, upon movement of the handle to its downward position against stop 177, the diluent and sample are removed from the respective chambers 37 and 84, and are discharged from the tip 184 in the proportion predetermined by the setting of the adjustable stops 54 and 103 previously described. Such discharge is effected by a raising of the plungers 39 and 88 which results from air under pressure from the pump outlet 183 being introduced into chambers 43 and 92 respectively. More particularly, with the handle in its down position, air under pressure from the outlet 183 passes through tubing 192 to tip 126, conduit 132, rotor passage 152, conduit 131, tip 124, tubing 193, sidearm 51 and pushrod 47 into the chamber 43. At the same time, it will be noted that rotor passage 152 is likewise in communication with chamber 92 through conduit 129, tip 123, tubing 194, sidearm 99, and the hollow rod 96. With respect to the discharge of the sample fluid, raising of the plunger 88 causes the sample to flow through tip 86 and tubing 201 to the discharge tip 184. As to the diluent, raising of the plunger 39, effects a diluent flow through tip 38, tubing 196, tip 159, orifice 163, rotor passage 166, orifice 164, tip 161, tubing 197, and through sidearm 87 into the sample chamber 84 for addition to and discharge with the sample contained therein. Since the system is completely filled with diluent at all times and diluent is always expelled in a single direction, if the cross-section of tip 184 is of a relatively small dimension, it will be apparent that no intermixing of samples or retention of residues occurs. At the completion of discharge the system is immediately in proper condition for further sampling.

There are innumerable applications of the dilutor in the clinical laboratory. In the hematology section, it is used to provide dilutions of whole blood for hemoglobin, white blood cell and red blood cell counts. In the clinical chemistry section the following determinations are now routinely performed using the dilutor: chloride, sodium, potassium, glucose, albumin, globulin, creatinine, and blood urea nitrogen. Each of the latter requires only 30–100 cu. mm. quantities of blood or serum.

The total time required to pipette and dilute serum samples is 10–12 seconds, so that 20 successive samples can be done within 5 minutes. This speeds most procedures. For example, in the chloride determination, using a colorimetric titrater, 20 complete analyses of serum, including standards, can be run in 20 minutes.

What is claimed is:

1. Unitary apparatus suitable for analytic procedures for precisely measuring and delivering a first diluent fluid with a second sample fluid, comprising a second sample displacement chamber means for receiving and discharging a precise volume of said sample, a second powered motive means for changing the volume of said displacement chamber between fixed limits, means for precisely adjusting said fixed limits of the second sample displacement chamber, a pipette tip in fluid communication with said second sample displacement chamber means, a first diluent displacement chamber means for receiving and discharging a precise volume of diluent from a diluent supply source, a first powered motive means for changing the volume of said diluent displacement chamber between fixed limits, means for precisely adjusting said fixed limits of the diluent displacement chamber, a motive power source, and a control valve means controlling the application of power to the first and second powered means from the motive power source and the fluid communications to said pipette tip, whereby power is applied to the second powered means to increase the volume in the second sample displacement chamber means to draw a precise quantity of sample fluid into the pipette tip, power is applied to the first powered means to increase the volume in the first diluent displacement chamber means and bring a fixed quantity of the first fluid therein, fluid communication is effected between the first displacement chamber means and the pipette, and power is applied to both the first and second powered means to decrease the volume in both the first and second displacement chambers to discharge the first and second fluids from the pipette.

2. Apparatus as defined in claim 1 wherein both of said motive means are double-acting cylinders and said motive power source is a combination source of vacuum and air pressure controlled through the valve means.

3. Apparatus as defined in claim 1 wherein said first and second displacement chambers are of a form wherein the fluid is displaced by means of a plunger entering the liquid containing volume thereof and a fixed stop is employed to limit the inward travel thereof and a calibrated micrometrically adjustable stop is employed to precisely limit the outward travel thereof.

4. Unitary apparatus suitable for analytic procedures for precisely measuring and delivering a sample fluid, comprising a pipette for taking up and discharging fluid, walls defining a chamber, duct means for providing fluid communication between said pipette and said chamber, a plunger mounted for reciprocation within said chamber in fluid-tight relation thereto for providing a differential volume within the chamber on movement of the plunger, a double-acting cylinder coupled to said plunger for providing reciprocating motion to the plunger within said chamber, a fixed stop limiting the movement of the double-acting cylinder and plunger in one direction, a micrometrically adjustable stop position to limit a movement of the double-acting cylinder and plunger in the opposite direction, and an air pressure and vacuum coupling means for actuating the double-acting cylinder between one limit position and the other limit position for changing the volume of said chamber to draw in and dispense an accurately fixed quantity of liquid through the pipette.

5. Apparatus as described in claim 4 including a compliant low friction plastic ring secured to the lower end of said chamber to maintain said fluid-tight relation.

6. Apparatus as defined in claim 4 wherein said adjustable stop includes a stop rod having one end attached to said double-acting cylinder and the free end of said rod terminating in an enlarged head portion and a micrometer screw element engageable said head portion of the stop rod to selectively limit downward travel thereof.

References Cited in the file of this patent

UNITED STATES PATENTS

| | | |
|---|---|---|
| 1,934,623 | Frick | Nov. 7, 1933 |
| 2,142,062 | Thurman | Dec. 27, 1938 |
| 2,724,581 | Pahl et al. | Nov. 22, 1955 |
| 2,737,978 | Eberz | Mar. 13, 1956 |
| 2,796,196 | Ortner | June 18, 1957 |
| 2,980,292 | Taylor | Apr. 18, 1961 |
| 3,012,863 | Feichtmeir | Dec. 12, 1961 |

Dedication 3,127,062.—*Thomas V. Feichtmeir*, San Francisco, *Kenneth D. Jenkins*, Berkeley, Calif. SEMI-AUTOMATIC SAMPLING AND DILUTING APPARATUS. Patent dated Mar. 31, 1964. Dedication filed Mar. 2, 1970, by the assignee, *American Optical Corporation*.

Hereby dedicates the remaining term of said patent to the Public.
[*Official Gazette July 7, 1970.*]